March 6, 1928.
C. V. FUQUA ET AL
SEPARATOR
Filed Oct. 11, 1926
1,661,284
2 Sheets-Sheet 2
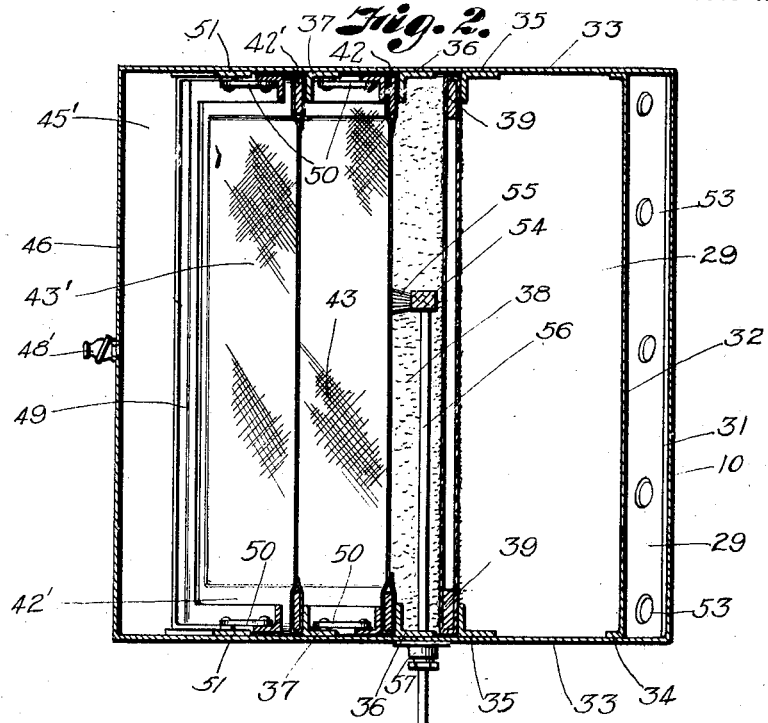
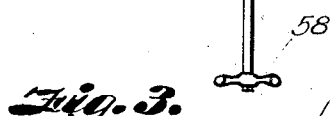
INVENTORS
Clarence V. Fuqua
John H. Richa.
BY
Arthur C. Brown
ATTORNEY Patented Mar. 6, 1928.

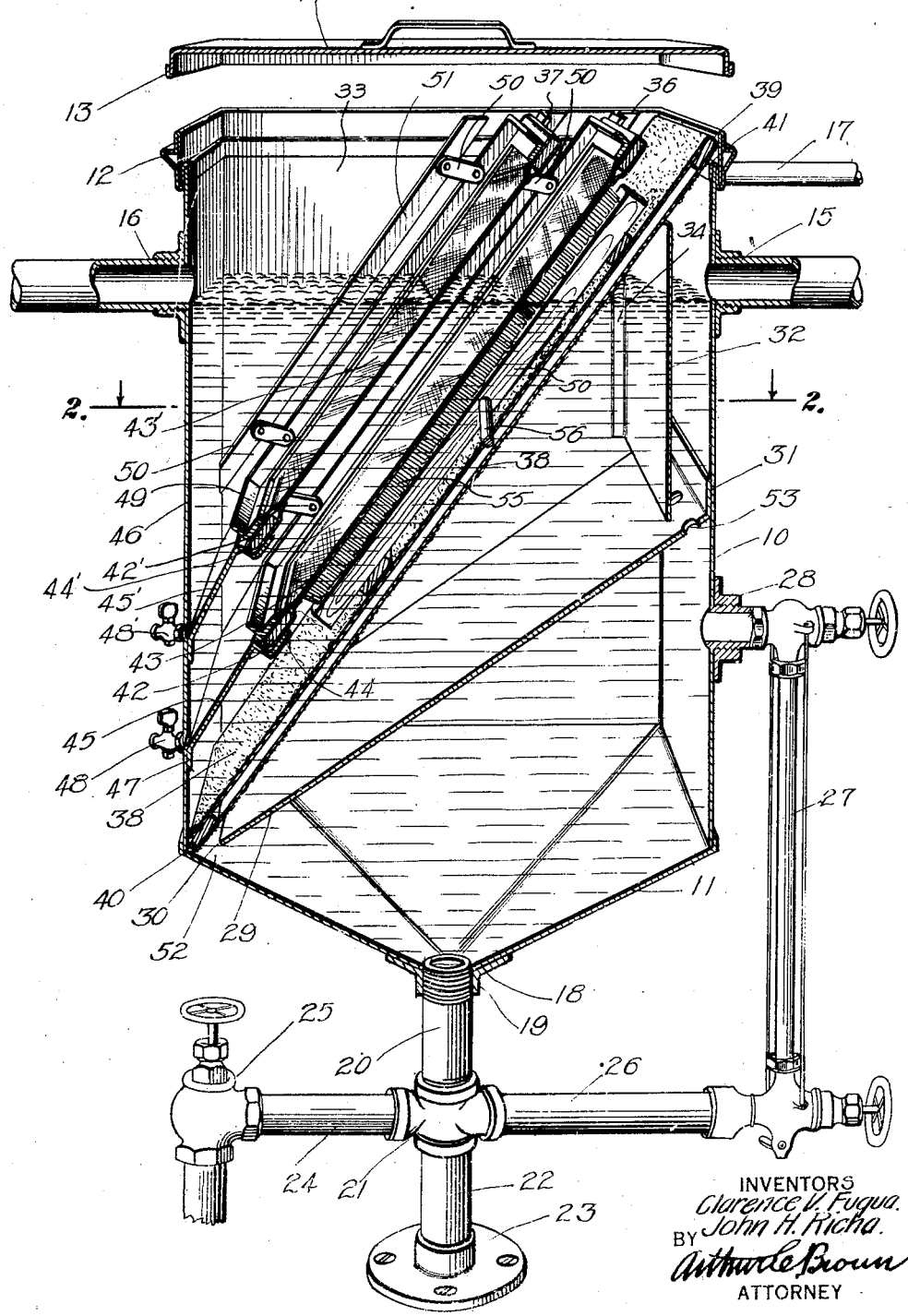

1,661,284

UNITED STATES PATENT OFFICE.

CLARENCE V. FUQUA AND JOHN H. RICHA, OF KANSAS CITY, MISSOURI, ASSIGNORS, BY MESNE ASSIGNMENTS, TO THE CLEANERS EQUIPMENT CORPORATION, OF KANSAS CITY, MISSOURI, A CORPORATION OF MISSOURI.

SEPARATOR.

Application filed October 11, 1926. Serial No. 140,829.

Our invention relates to a cleaning apparatus, and more particularly to the separator used in clarifying cleaning fluids such as naphtha, gasoline, or other solvents such as what is known as "Stoddard's solvent" which is commonly used in the cleaning industry to clean public wearing apparel, and is a continuation in part of my application filed December 6, 1924, Serial No. 754,357.

It is a purpose of our invention to provide a separating device for removing chemicals used in reclaiming cleaning fluid, sediment and water from cleaning fluids in a cleaning plant, that comprises a plurality of screens arranged between an inlet and an outlet in a tank, one of said screens preferably comprising Turkish toweling and other screens preferably being provided that comprise bolting silk. Water, alkali or other chemicals and sediment when permitted to pass through the chemical cleaning process and enter the machine wherein wearing apparel is cleaned is very detrimental, and in many cases positively ruins the garments.

The screens are preferably arranged at an oblique angle in the tank and a partition is preferably provided in the tank separating the same into an upper and a lower chamber, the inclined screens being arranged in the upper chamber. Preferably the partition between the upper and the lower chambers is also inclined in the same general direction as the screens and is provided with a baffle plate extending upwardly from near the upper end thereof across the inlet to the tank. In order to provide for the passage of air out of the lower chamber, vent openings are preferably provided in the partition in that portion thereof lying between the baffle plate and the side wall of the tank.

It is another purpose of the invention to provide means for cleaning a screen such as used in our improved apparatus, said means comprising a member movable across the screen, said member being preferably a brush-like member. The inclined screens are preferably provided with inclined, shelf-like portions below the lower edges thereof, forming receptacles for the accumulation of water and sediment that is adapted to be drawn off through a suitable drain valve provided at the lower ends of said inclined shelf-like members of the screens.

It is another object of the invention to provide new and improved means for securing the screens in position in the tank and for clamping the same to the inclined shelf members associated therewith, so as to make a substantially fluid-tight joint between the inclined shelves and the screens. Said member preferably comprises a frame that is adapted to engage the frame upon which the screen is mounted, said frame being mounted on the tank so that it can be moved into clamping relation with the screen frame.

Other objects and advantages of the invention will appear as the description of the accompanying drawings proceeds. However, we desire to have it distinctly understood that we do not intend to limit ourselves to the exact details shown or described, but that we intend to include as part of our invention all such obvious changes and modifications of parts as would occur to a person skilled in this art and as would fall within the scope of the claims.

In the drawings:

Fig. 1 is a vertical, sectional view of our improved separator.

Fig. 2 is a section thereof taken on the line 2—2, Fig. 1, and

Fig. 3 is a perspective view of one of the screens and the clamping frame associated therewith, showing the same separated and detached from the tank.

Referring in detail to the drawings:

Our improved separating device comprises a tank 10 that is substantially rectangular in cross section and that is provided with a tapering bottom portion 11. The tank is provided with a suitable flange 12 around the upper edge thereof against which the downturned flange 13 of the cover member 14 is adapted to seat. The tank is further provided with an inlet 15 and an outlet 16 near the top thereof but spaced from the top, and with an overflow and vent pipe 17 above the inlet 15 and outlet 16. The inclined bottom 11 tapers to a substantially conical lower end portion 18 which is provided with an internally threaded flange member 19 that receives the pipe 20 which acts both as a drain pipe and as a support for the tank, the fitting 21 being secured to the pipe 20 and a pipe 22 connecting said fitting with the flange 23 that may be secured to any suitable support upon which the tank 10 is mounted. From the fitting 21 a pipe 24 leads to the drain valve 25 and a pipe 26 connects with the lower end of the gauge 27, the upper end of which is connected with the tank 10 by means of the flange 28.

Mounted within the tank 10 is an inclined partition 29, the lower edge 30 of which ends in spaced relation to the side wall of the tank 10 substantially at the upper end of the tapering bottom 11 thereof. The upper end of the partition 29 terminates in a flange 31 that is secured in any suitable manner to the opposite side wall of the tank 10 and a vertically extending partition or baffle plate 32 is secured to the inclined partition and to the side walls 33 of the tank 10 extending at right angles to the first mentioned walls by means of the flanges 34 on said baffle plate 32. Secured to the side walls 33 are the pairs of inclined angle members 35, 36 and 37. The angle members 35 provide obliquely extending ledges upon which is mounted the screen 38 which is preferably of Turkish toweling and which has a frame 39 seating upon the angle members 35 and also resting in the corner 40 formed between the tapering bottom 11 and the main body portion of the tank 10, the upper end of the frame 39 resting upon the ledge formed at 41 by the joint between the flange member 12 and the tank body 10. The Turkish toweling screen 38 is made of two plies, as will be clear from Fig. 1, and is mounted closely adjacent the upper edge of the baffle plate 32. The angles 36 support a screen having a frame 42 upon which is mounted a ply of silk bolting cloth 43. The lower transversely extending portion of the frame 42 is mounted upon an offset flange 44 provided on the inclined shelf-like member 45 that is secured to the side wall 46, extending at right angles to the walls 33, by means of the flange 47 provided thereon. A drain valve such as the petcock 48 is provided in the wall 46 substantially where the inclined shelf 45 meets the wall 46.

Mounted on the angle members 37 is a frame 42′ of a screen having a ply of silk bolting cloth 43′ secured thereto, the lower transverse member of the frame 42′ resting on the offset flange 44′ of the inclined shelf-like member 45′ which is similar to the member 45 and which is provided with a drain valve 48′. The screens are clamped in position by means of the clamping frames 49 which are preferably made of angle iron and which have the links 50 pivotally secured thereto, there being one pair of said links on each side of said frame members 49. A pair of bars 51 is also provided, arranged in spaced relation to the angles 36 and 37 on each side of the tank, to which the other ends of the links 50 are pivoted, the spacing of the bars 51 and the length of the links 50 being such that when the links 50 are straightened so as to extend substantially at right angles to the angles 36 and 37, the frame 49 will be firmly clamped on the frame 42 or 42′ thus firmly clamping either the frame 42 or the frame 42′ to its supports. As the bolting cloth extends around the frames 42 and 42′ this clamping action will clamp the bolting cloth between the flanges 44 and 44′ and the frames 42 and 42′ respectively, to provide a substantially liquid-tight joint between the members 45 and 45′ and the screens mounted thereon.

In operation the cleaning fluid enters through the inlet 15 and passes over the baffle plate 32 and through the Turkish toweling 38, the Turkish toweling acting to separate water, alkali and foreign matter from the cleaning fluid by gathering small particles of alkali and moisture thereon and releasing the same in larger quantities. The Turkish toweling also acts to absorb animal fats from the cleaning fluid. The sediment, alkali and water drops down toward the partition 29 and travels down the same, passing through the narrow opening left at 52, between the lower edge 30 of the partition 29 and the tapering wall portion 11 of the tank, into the lower chamber of the tank. This is then drawn off through the pipe 20 by means of the valve 25. As the lower chamber fills, air passes out through the openings or air vents 53 provided in that portion of the partition 29 lying between the baffle plate 32 and the wall of the tank 10 to which the partition is attached, the air passing upwardly and out through the pipe 17. After the cleaning fluid has passed through the Turkish toweling, 38, the same passes through the screen of bolting cloth 43 and eventually through the bolting cloth screen 43′ and finally out through the outlet 16, the cleaning fluid in the chamber formed between the screen, the inclined shelf-like member 45′ and the walls of the tank 10 being practically clean and pure. Should there be any water or sediment therein, however, it will collect in the lower end of the shelf 45′ where it can be discharged through the drain valve 49. In a similar way, material passing through the first screen 43 but not through the second screen 43′, will settle to the lower end of the shelf 45′ where it can be discharged through the drain valve 48.

As a large amount of dirt and sediment collects on the under side of the screen 43, means is provided for removing the same so that the meshes of the screen will not become clogged. Said means comprising a body portion 54 of a brush-like member having the bristles 55 and which is moved across the screen 43 on the under side thereof by means of the operating rod 56 that passes through a suitable gland or other packed joint 57 and which is provided with a handle 58 for reciprocating the same.

The screens can be readily removed by unclamping the frames 49 therefrom, this being accomplished by an upward movement of the frames, causing the links 50 to assume an angular position and moving the frames away from the screens. The screen 38 can be readily removed by lifting the same and pulling the same out through the top of the tank.

What we claim and desire to secure by Letters Patent is:

1. In a device of the character described, a tank having a partition therein dividing the same into an upper and a lower chamber, an inlet at one side of said upper chamber, an outlet at the other side thereof, a plurality of screens mounted between said inlet and outlet, said screens being arranged at an oblique angle and a plurality thereof comprising members of bolting cloth and inclined shelf-like members at the lower ends of said screens.

2. In a device of the character described, a tank having a partition therein dividing the same into an upper and a lower chamber, an inlet at one side of said upper chamber, an outlet at the other side thereof, a plurality of screens between said inlet and outlet, said screens being arranged at an oblique angle and a plurality thereof comprising members of bolting cloth and inclined shelf-like members at the lower ends of said screens, said tank being provided with drain valves adjacent the lower ends of said inclined shelf-like members.

3. In a device of the character described, a tank having a partition therein dividing the same into an upper and a lower chamber, an inlet at one side of said upper chamber, an outlet at the other side thereof, and a plurality of screens mounted between said inlet and said outlet, said screens being arranged at an oblique angle and comprising a screen of bolting cloth having an inclined shelf-like member at the lower end thereof, said tank having a drain valve at the lower end of said shelf-like member.

4. In a device of the character described, a tank having an inclined partition therein dividing the same into an upper and a lower chamber, an inlet at one side of said upper chamber, an outlet at the other side thereof, a plurality of screens mounted between said inlet and said outlet, one of said screens comprising Turkish toweling, and a baffle plate extending from said inclined partition in front of said inlet, said partition having vent openings between said baffle plate and the side wall of said tank at the upper end thereof.

5. In a device of the character described, a tank having inclined ledges along opposite side walls thereof, a screen having a frame adapted to rest on said ledges and means on said tank for clamping said frame to said ledges, said means including links pivotally connected to said walls.

6. In a device of the character described, a tank having inclined ledges along opposite side walls thereof, a screen having a frame adapted to rest on said ledges and a frame mounted on said tank provided with means pivotally connected to said walls for clamping said screen frame to said ledges.

7. In a device of the character described, a tank having inclined ledges along opposite side walls thereof, an inclined shelf having an offset flange extending between said ledges, a screen having a frame adapted to rest on said ledges and flange, and a clamping member fixed to said tank and having movable parts for clamping said frame to said ledges and said flange to make a tight joint between said shelf and said screen.

8. In a device of the character described, a tank having an inlet at one side thereof and an outlet at another side thereof, a plurality of screens between said inlet and outlet, and shelf-like members at the lower ends of said screens, said tank being provided with drain valves adjacent the lower ends of said shelf-like members.

9. In a device of the character described, a tank having an inlet at one side and an outlet at another side thereof, an inclined partition mounted in the tank and dividing the same into an upper and a lower chamber, a baffle plate extending from said inclined partition in front of said inlet, said partition having vent openings between said baffle plate and the side wall of the tank.

In testimony whereof we affix our signatures.

CLARENCE V. FUQUA.
JOHN H. RICHA.